(12) United States Patent
Durfee, Jr.

(10) Patent No.: US 12,238,233 B1
(45) Date of Patent: Feb. 25, 2025

(54) GRIP SHIELD FOR CELL PHONES

(71) Applicant: David L Durfee, Jr., Meadville, PA (US)

(72) Inventor: David L Durfee, Jr., Meadville, PA (US)

( * ) Notice: Subject to any disclaimer, the term of this patent is extended or adjusted under 35 U.S.C. 154(b) by 0 days.

(21) Appl. No.: 18/215,783

(22) Filed: Jun. 28, 2023

Related U.S. Application Data

(60) Provisional application No. 63/356,216, filed on Jun. 28, 2022.

(51) Int. Cl.
*H04B 7/00* (2006.01)
*H04M 1/02* (2006.01)

(52) U.S. Cl.
CPC ................................ *H04M 1/0281* (2013.01)

(58) Field of Classification Search
CPC .. H04M 1/0281; H04M 1/0254; H04M 1/026; H04M 1/7246
See application file for complete search history.

(56) References Cited

U.S. PATENT DOCUMENTS

| 12,028,472 B1 * | 7/2024 | Brammer | H04M 1/04 |
| 2013/0140837 A1 * | 6/2013 | Carroll | F16M 13/04 |
| | | | 294/142 |
| 2019/0335031 A1 * | 10/2019 | Nahum | F16M 11/041 |

* cited by examiner

*Primary Examiner* — Tuan Pham
(74) *Attorney, Agent, or Firm* — Richard K Thomson

(57) ABSTRACT

A grip shield is provided for a cell phone accessory to enhance its functionality. The grip shield is secured to a rim of an extendible accordion accessory to provide a backstop for the user's hand, a downwardly extending flange for reducing catching on pockets and pocketbook items, as well as enhancing the aesthetics of the device.

7 Claims, 5 Drawing Sheets

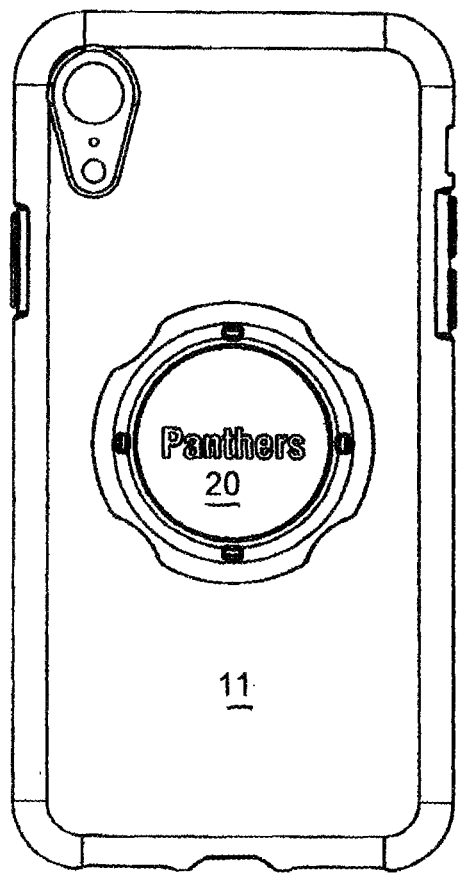
Fig. 1E
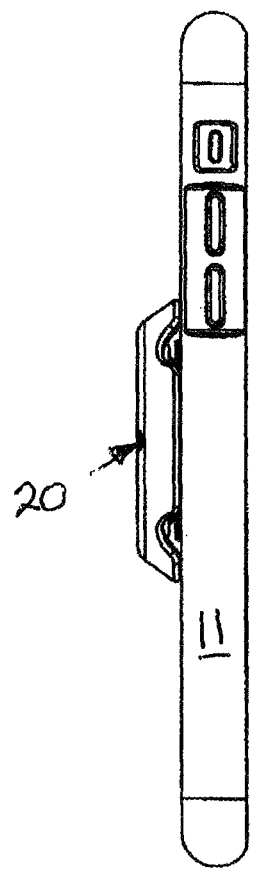
Fig. 1F
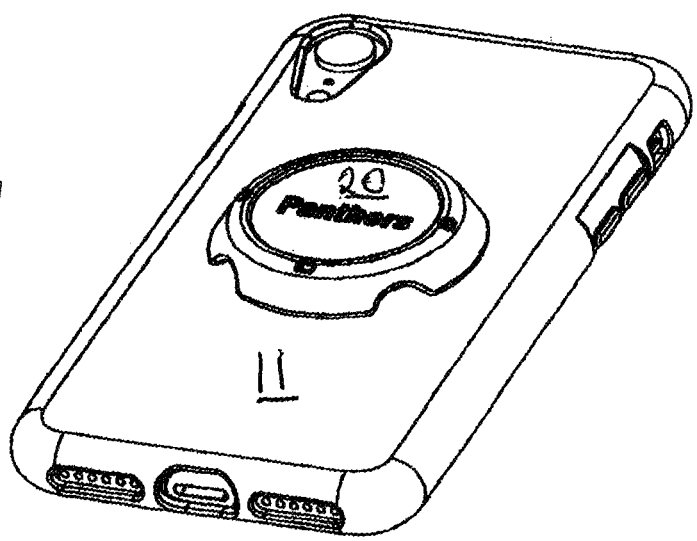
Fig. 1G
Fig. 1H

SECTION A-A

SECTION A-A

GRIP SHIELD FOR CELL PHONES

This application claims priority from provisional patent application No. 63/356,216 which is hereby incorporated by reference in its entirety.

BACKGROUND AND SUMMARY OF THE INVENTION

The present invention is directed to the field of telecommunications. More particularly, the present invention is directed to apparatus for facilitating the handling of cell phones, and the like.

Cell phones are exploding in popularity and utilization. It is not uncommon for individuals to have 2 or 3 phones for different applications. With all the bells and whistles available for cell phones, cameras, internet, a variety of apps, it is not uncommon for phones to sell for in excess of $1000. As detailed in Applicant's earlier patent, U.S. Pat. No. 10,368,628, one of the greatest needs is for a better way to grasp the phone for utilization. Ensuring the cell phone is not damaged or destroyed as a result of an unnecessary droppage is of paramount importance.

An important step was made in this regard by Pop Socket with features detailed in U.S. Pat. No. 8,560,031. A retractable accordion grip element is attached to the back of the cell phone or its case to facilitate handling. However, such devices have proved to be suspect for allowing the phone to slip inadvertently from the user's hand.

It is among the objects of the present invention to provide a grip shield which can be attached to the button which extends laterally past the edges of the upper extremity of the collapsible accordion conical member, or similar extendable grasp-enhancing element. The grip shield extends behind the fingers of the user and, in essence, grips the user's hand, avoiding any "fumble fingers" incidents which can damage or destroy the phone. In addition, the grip shield of the present invention is provided with a downwardly protruding flange which protects the button from catching on pockets or purse paraphernalia making the original device more user friendly.

The present invention is directed to an improvement for an accessory for enhancing the grasping of a cell phone, the accessory having a radially extending button at its distal end, the improvement comprising: a) a generally circular element, i) a downwardly extending flange protruding from an outer reach of the circular element; ii) at least one recess in the downwardly extending flange for engagement by a finger; iii) attachment means to secure the circular element to the radially extending button. The attachment means can comprise an adhesive for securing said circular element to a top portion of the radially extending button; a plurality of inwardly extending fingers which engage under a lip of the radially extending button to secure the generally circular element in place; or an inwardly extending peripheral ridge which is rolled under a lip of the radially extending button to secure the generally circular element in place. It is within the purview of the present invention to construct the grip shield as an integral part of the accessory or its button.

The at least one recess preferably comprises a plurality of recesses, the plurality most preferably comprising four equally spaced recesses extending about a periphery of the downwardly extending flange. The generally circular element optionally has a circular opening which receives a printable insert bearing a team indentification (name/logo, etc).

Various other features, advantages, and characteristics of the present invention will become apparent after a reading of the following detailed description.

BRIEF DESCRIPTION OF THE DRAWINGS

The preferred embodiment(s) of the grip shield of the present invention is/are described in conjunction with the associated drawings in which like features are indicated with like reference numerals and in which

FIG. 1E is a top view of a first embodiment of the grip shield of the present invention with the accessory to which it is attached in a collapsed position;

FIG. 1F is a side view of the first embodiment shown in FIG. 1E;

FIG. 1G is an end view of the first embodiment shown in FIG. 1E;

FIG. 1H is a front perspective view of the first embodiment shown in FIG. 1E;

DETAILED DESCRIPTION OF THE PREFERRED EMBODIMENT(S)

Figure 1A:
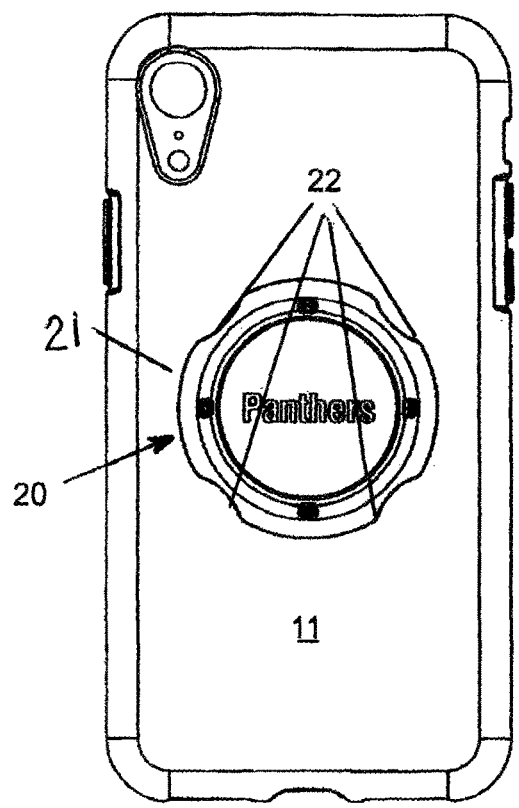
FIG. 1A is a top view of a first embodiment of the grip shield of the present invention attached to an extended grasp-enhancing element on a cell phone.
Figure 1B:
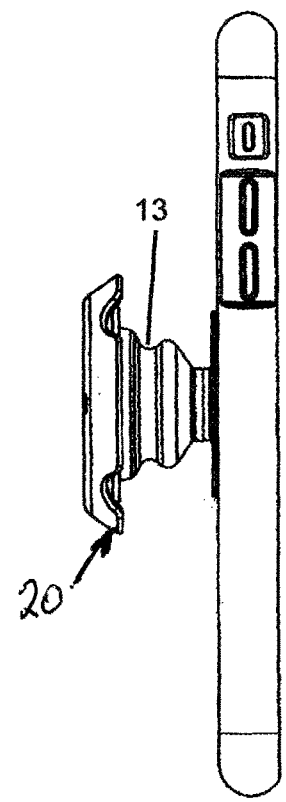
FIG. 1B is a side view of the first embodiment shown in FIG. 1A.
Figure 1C:
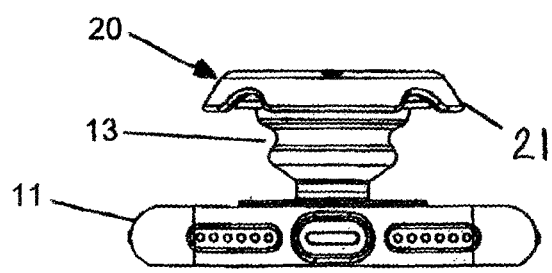
FIG. 1C is an end view of the first embodiment shown in FIG. 1A.
Figure 1D:
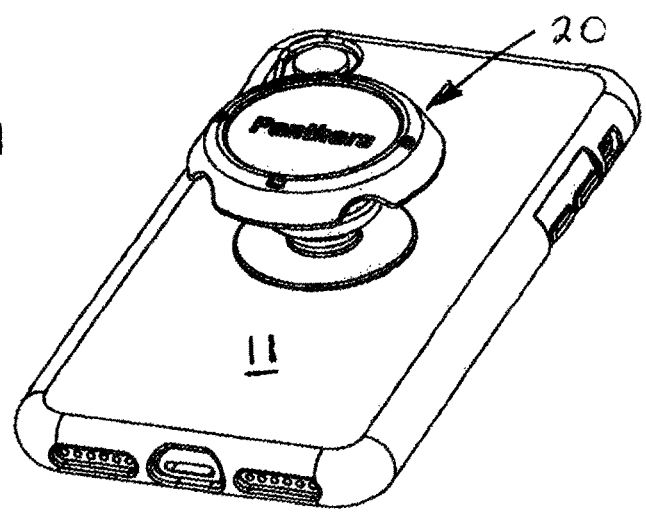
FIG. 1D is a front perspective view of the first embodiment shown in FIG. 1A.
Figure 2A:
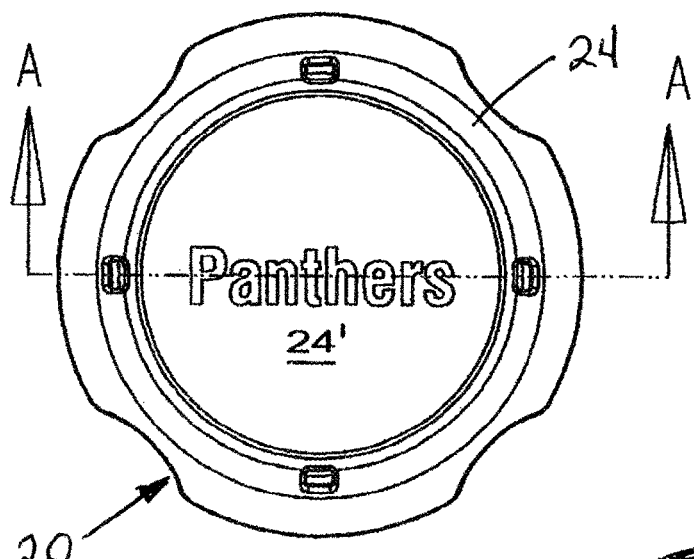
FIG. 2A is a enhanced top view of the first embodiment of the present invention.
Figure 2B:
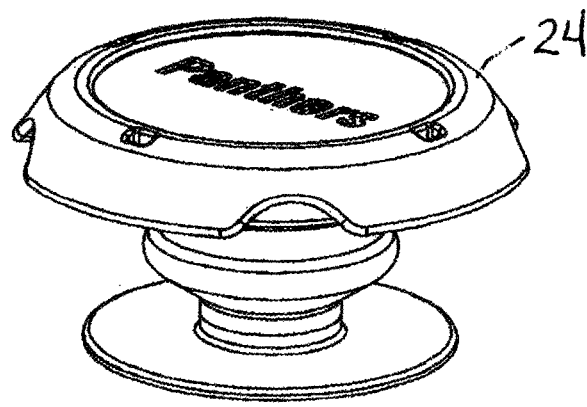
FIG. 2B is a side perspective view of the first embodiment and seen in FIG. 2B.
Figure 2C:
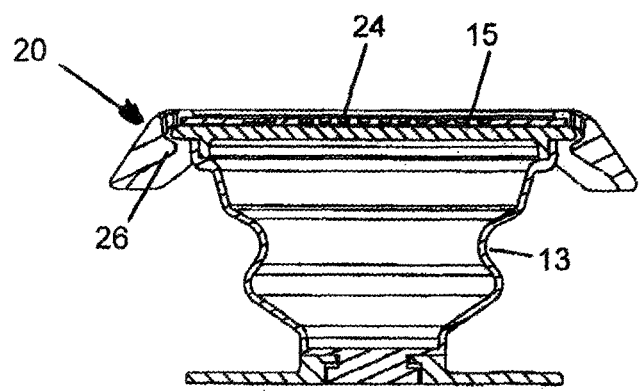
FIG. 2C is a cross-sectional view of the first embodiment as taken along section A-A in FIG. 2A.

A first embodiment of the grip shield of the present invention is depicted in FIGS. 1A-2C generally at 20. Grip shield 20 comprises a generally circular element 24 with a downwardly extending flange 21. Flange 21 has at least one, and preferably a plurality of recesses 22 which can be engaged to extend the element 13 to which it is attached from a compressed position shown in FIGS. 1E-1H to the extended position shown in FIGS. 1A-1D. Grip shield 20 is provided with a plurality of inwardly extending fingers 26 which snap under the rim 16 of button 15 to secure grip shield 20 to button 15.

The downwardly extending flange 21 has several purposes. It protects button 15 (FIG. 3C) from entanglement with pockets and pocketbook paraphernalia. Secondly, it provides a "backstop" for the user's fingers reducing the possibility of fumbling the phone to the floor. Lastly, it provides a more appealing aesthetic for the phone assembly 11.

An additional feature of the grip shield 20 of the present invention, in a first embodiment, is to provide a region to display graphics on a printable insert 24'. This can be a team name or logo including football, baseball, soccer, hockey, etc., at a professional, college or highschool level. Other product or personal names can be displayed, as well.

Figure 3A:
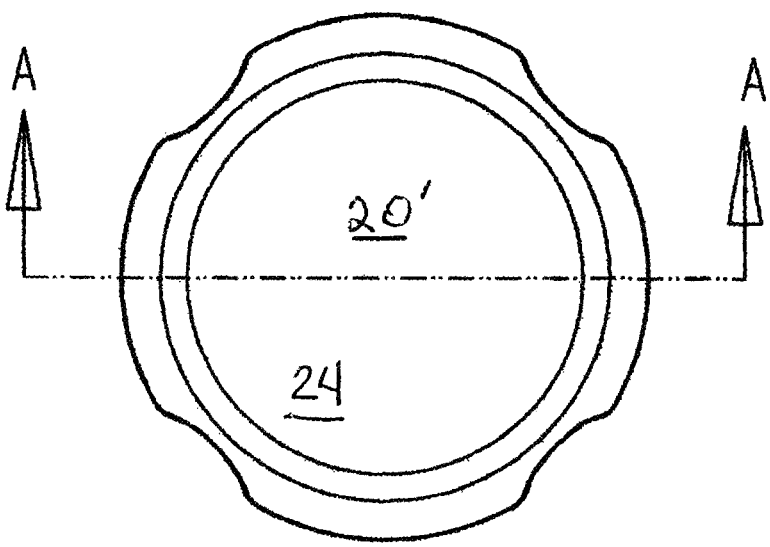
FIG. 3A is top view of a second embodiment of the grip shield of the present invention.
Figure 3B:
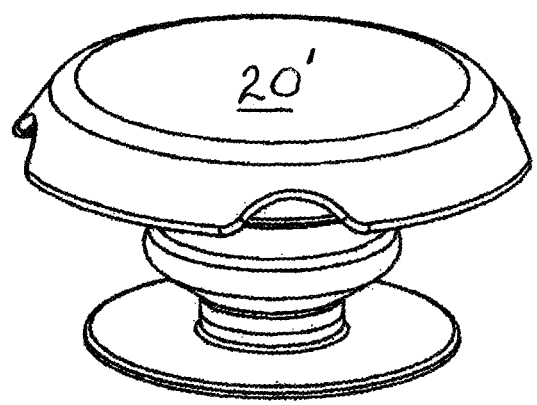
FIG. 3B is a side perspective view of the second embodiment.
Figure 3C:
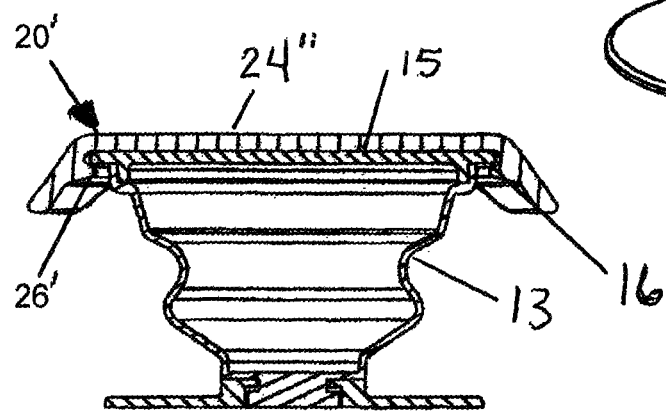
FIG. 3C is a cross-sectional view of the second embodiment.

The first embodiment 20 may be made of a rigid plastic material and forms a rigid plastic "snap cap" version of the grip shield 20. Second embodiment 20' is made without the potential for an insertable graphic display but, rather has a solid generally circular element 24" (FIG. 3). This embodiment is made of an elastomeric material and it has an inwardly extending rib 26' which will be secured to the rim 16 of button 15 by rolling the rib 26' under the rim 16 in the manner of attaching a plastic lid to its container.

Figure 4C:
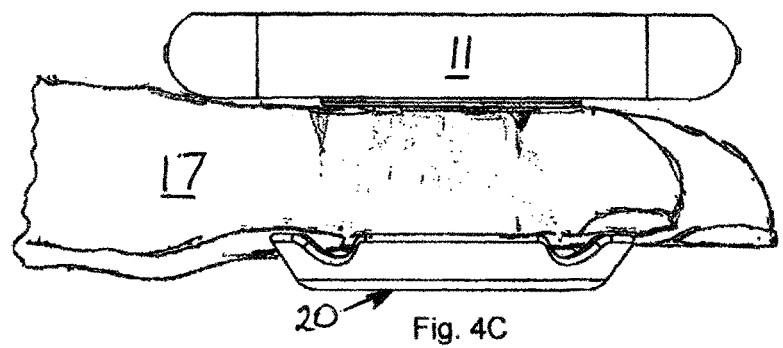
FIG. 4C is an end view showing the accessorized phone of FIG. 4A.
Figure 4A:
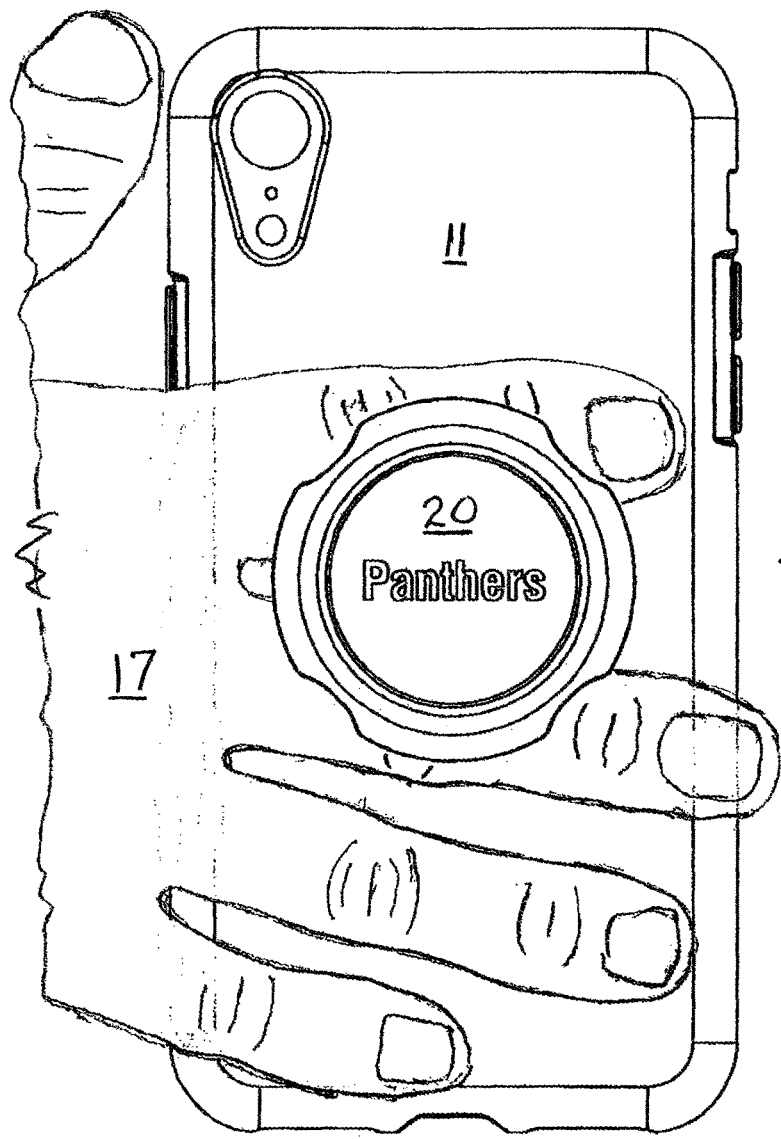
FIG. 4A is a front view of a cell phone employing the grip shield accessory of the present invention.
Figure 4B:
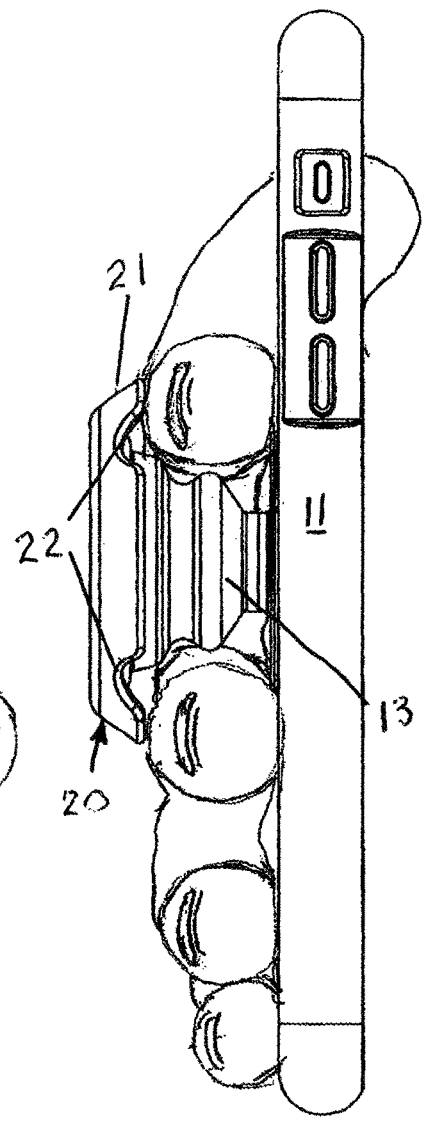
FIG. 4B is a side view if the phone and accessory shown in FIG. 4A.

FIGS. 4A-4C show grip shield 20 in use in a conical extendible accordion element 13. While both the rigid "snap cap" version and the "rolling rubber rib" versions will in essence, grip the fingers of the user, the "rolling rubber rib" version will provide additional gripping of the user's fingers as well as gripping friction from the nature of the elastomeric material. It will also be apparent that the finger recesses 22 will overlap portions of the user's fingers affording additional gripping of the cell phone 11 by virtue of the grip shield accessory 20.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. In an accessory for enhancing the grasping of a cell phone, the accessory having a radially extending button at its distal end, an improvement comprising:
   a) a generally circular element,
      i) a downwardly extending flange protruding from an outer reach of said circular element;
      ii) at least one recess in said downwardly extending flange for engagement by a finger;
      iii) attachment means to secure said circular element to the radially extending button.

2. The improvement of claim 1 wherein said attachment means comprises an adhesive for securing said circular element to a top portion of the radially extending button.

3. The improvement of claim 1 wherein said attachment means comprises a plurality of inwardly extending fingers which engage under a lip of the radially extending button to secure said generally circular element in place.

4. The improvement of claim 1 wherein said attachment means comprises an inwardly extending peripheral ridge which is rolled under a lip of the radially extending button to secure said generally circular element in place.

5. The improvement of claim 1 wherein said at least one recess comprises a plurality of said recesses.

6. The improvement of claim 5 wherein said plurality of said recesses comprises four equally spaced recesses extending about a periphery of said downwardly extending flange.

7. The improvement of claim 1 wherein said generally circular element has a circular opening which receives a printable insert bearing a team identification.

* * * * *